United States Patent
Sekine

[19]

[11] Patent Number: 6,126,117
[45] Date of Patent: Oct. 3, 2000

[54] STATE CONTROL DEVICE OF MOVING BODY AND ITS STATE CONTROL METHOD

[75] Inventor: Koji Sekine, Tokyo, Japan

[73] Assignee: NEC Corporation, Tokyo, Japan

[21] Appl. No.: 09/211,750

[22] Filed: Dec. 15, 1998

[30] Foreign Application Priority Data

Dec. 25, 1997 [JP] Japan ................................. 9-356567

[51] Int. Cl.[7] ................................................ B64G 1/24
[52] U.S. Cl. ........................... 244/176; 701/226; 701/13
[58] Field of Search ............................. 244/158 R, 164, 244/171, 176; 701/13, 226

[56] References Cited

U.S. PATENT DOCUMENTS

| | | |
|---|---|---|
| 3,516,288 | 6/1970 | Gnavi . |
| 5,058,836 | 10/1991 | Nobel ..................................... 244/176 |
| 5,311,435 | 5/1994 | Yocum et al. .......................... 244/176 |
| 5,517,418 | 5/1996 | Green et al. . |
| 5,852,792 | 10/1998 | Nielson .................................. 244/164 |
| 5,862,495 | 1/1999 | Small et al. ............................... 701/13 |
| 5,949,675 | 9/1999 | Holmes et al. ......................... 244/176 |
| 5,984,238 | 11/1999 | Surauer et al. ......................... 244/176 |
| 6,000,661 | 12/1999 | Price et al. .............................. 244/176 |

FOREIGN PATENT DOCUMENTS

| | | |
|---|---|---|
| 62-125998 | 6/1987 | Japan . |
| 3-125699 | 5/1991 | Japan . |
| 8188199 | 7/1996 | Japan . |
| 8282598 | 11/1996 | Japan . |
| 8315397 | 12/1997 | Japan . |

OTHER PUBLICATIONS

A Conformal Type Posture Control System in the Antenna Driving of an Artificial Satellite (Katsuhiko Yamada et al., Technical Report of the Mitsubishi Electric Company, vol. 71, No. 9, Sep. 1997, pp. 797–802).

An Office Action Issued by the Japanese Patent Office for the Corresponding Japanese Application on Mar. 16, 1999 and an English Translation Thereof.

*Primary Examiner*—Galen L. Barefoot
*Attorney, Agent, or Firm*—Ostrolenk, Faber, Gerb & Soffen, LLP

[57] ABSTRACT

To provide an inexpensive attitude control device and attitude control method of a spacecraft for easily and accurately compensating for disturbance with a simple constitution, in a state control device 20 of a moving body constituted by a navigation dynamics 2, an actuator 5 for driving the navigation dynamics 2, first controlling means 4 for controlling the actuator 5 in PID control in response to a first output signal O1 outputted from the navigation dynamics 2 and adding means 10 for outputting a control signal u for controlling the actuator 5 in feedforward control in response to outside noise by adding an estimated value q of the outside noise to a control signal outputted from the first controlling means 4, further installing with second controlling means 9 for outputting an error amount of the estimated value of the outside noise based on a second signal O2 outputted from the navigation dynamics and an error amount value of the estimated value of the outside noise outputted from the second controlling means 9 is inputted to the adding means 10.

12 Claims, 6 Drawing Sheets

STATE CONTROL DEVICE OF MOVING BODY AND ITS STATE CONTROL METHOD

BACKGROUND OF THE INVENTION

1. Field of the Invention

The present invention relates to a state control device of a moving body and a state control method of a moving body, particularly to a state control device of a moving body and a state control method of a moving body in a spacecraft.

2. Description of Related Art

Conventionally, there have been proposed many methods in a state control system including, for example, attitude control or the like in a moving body including a spacecraft.

However, according to a spacecraft such as an artificial satellite or the like, a request of mount mission in recent years has become severe in accuracy and accordingly, for example, the following promotion in function is needed.

1) To promote accuracy in attitude control in respect of a target attitude value of a satellite. (reduce an absolute value of error)
2) To promote attitude stability in respect of the target attitude value of a satellite. (restrain rate variation at low frequencies, in other words, realize a satellite which is stationary even with disturbance)
3) To promote response in respect of the target attitude value of a satellite.
4) To provide high directional capacity in a satellite configuration having a large-sized and flexible solar cell paddle, a drive antenna having large angular momentum or other pointing devices.
5) To achieve shortening of an adjustment time period and promotion of design efficiency by making interface with other subsystem constituting a disturbance source exemplified as described above as simple as possible.
6) With regard to the above-described 5), to be able to further promote removal of an attitude error which cannot be removed by a feedforward system of an attitude control system based on a drive signal (angle/angular velocity or the like) of an antenna which has been carried out generally.

Figure 7:
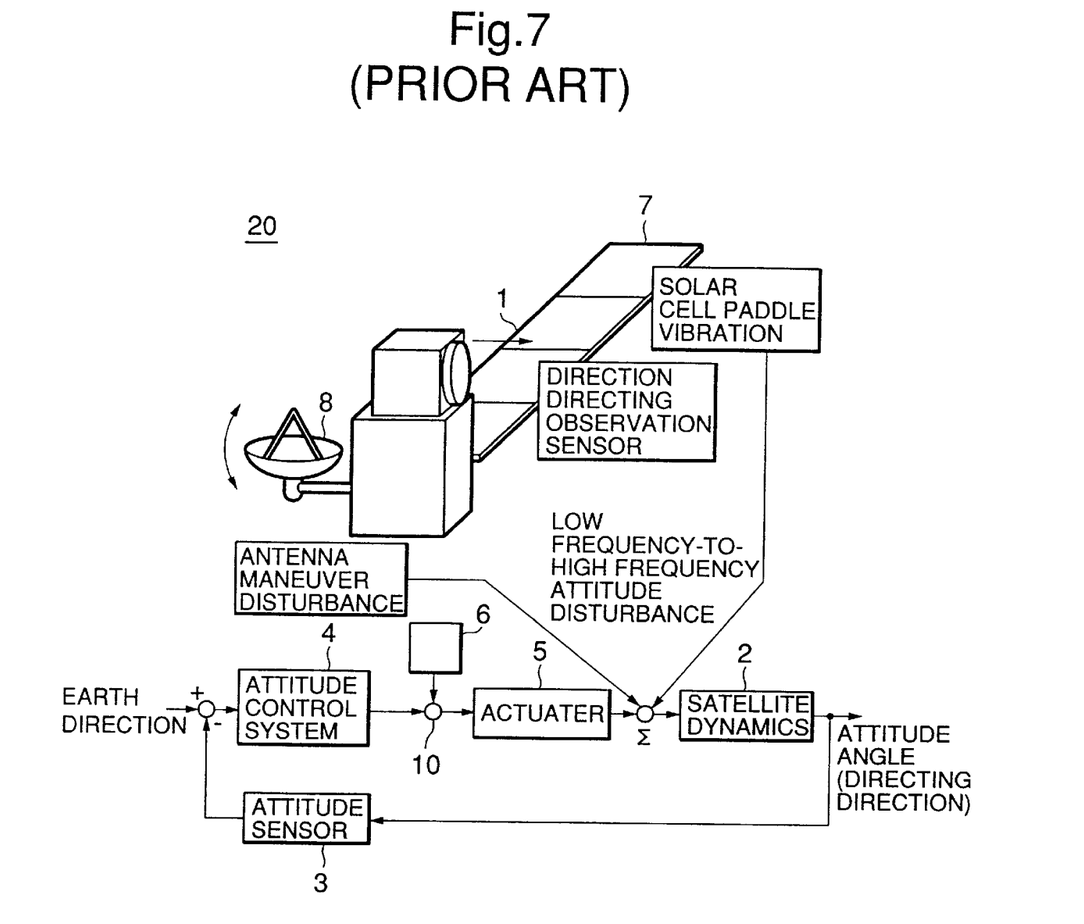
FIG. 7 is a block diagram showing a specific example of a conventional control device of a moving body.

In the meantime, as a general attitude control system of a spacecraft which has been conventionally known, as shown by FIG. 7, information of rotational angle information, rotational angular velocity information or the like of a spacecraft 1 which is outputted from a navigation dynamics 2 of the satellite inherently provided to the spacecraft 1 per se, is detected by an attitude sensor 3, the information is inputted to an attitude control system 4 for executing, for example, a PID (Proportional ,Integral, Differential) control and the PID control system 4 generates a control command for driving wheels and the like to thereby rotate the wheels by predetermined amounts by which the attitude of the spacecraft 1 is controlled.

In such a case, various disturbance is applied to the spacecraft 1 and therefore, it is general to constitute the control system by previously anticipating the amount of disturbance.

For example, Japanese Unexamined Patent Publication No. JP-A-8-188199 discloses a technology of installing estimated disturbance removing signal generating means 6 in which the magnitude of disturbance applied on the main body of a satellite is estimated, a disturbance removing signal for removing the disturbance noise is generated and an estimated disturbance removing signal is generated along with an attitude control signal provided from the attitude control system.

Meanwhile, according to such an attitude control system of a spacecraft, there causes enormous restriction in constructing a high accuracy attitude control system by being significantly influenced by accuracy in parameters of a drive system, that is, factors of mass characteristic, angle detection accuracy, calculation accuracy of angular velocity, calculation accuracy of angular acceleration, communication delay, jitter component of communication time period accompanied by synchronous processings among different computers and so on.

For example, Japanese Unexamined Patent Publication No. JP-A-3-125699 discloses a method in which in the attitude control of a spacecraft, a feedforward compensation signal is used and high frequency components are removed from the feedforward compensation signal.

According to such a publicly-known example, in carrying out the feedforward calculation, when angular velocity derived from a quasi differential value (difference) is calculated from angle information of a drive system at a control period and angular momentum or angular acceleration of a further higher order, that is, disturbance torque is calculated, time-sequential data of angular velocity obtained from the drive system by a low pass filter, is smoothed to remove noise components and low frequency components are separated.

Therefore, according to such a publicly-known example, although the noise components caused in calculating the quasi differential value are eliminated to some degree, instead, a delay is caused by time constant of the low pass filter, a function of "adding compensation torque having a reverse phase simultaneously with the drive system" which is most important in the feedforward control, is sacrificed and a restriction seems to be caused in realizing promotion of accuracy in attitude control or attitude stability in which the above-described requested value has become severe.

Further, when the accuracy is intended to improve, a computer for an attitude system needs to calculate in synchronism with a computer for mounting the drive system, communication interruption processings are needed or tolerance of mass characteristic of the drive system needs to prescribe to an extreme which may significantly enhance function, adjustment time period and design cost.

That is, although disturbance per se cannot be actually measured and therefore, the disturbance needs to estimate by some method, when the estimation is intended to be accurate, the system per se becomes complicated which amounts to an increase in cost and further, a plurality of computers mounted on the spacecraft 1 are operated asynchronously to each other and accordingly, timing of the processing of the disturbance information needs to match which makes the system further complicated.

Further, in the spacecraft 1 of recent times, when the structure of an antenna 8 or a solar cell panel 7 is large-sized and a flexible structure is adopted, antenna maneuver disturbance caused by the antenna occurs, movement and vibration of the antenna or the solar cell panel is enhanced and constitutes low frequencies and therefore, reaction which is disturbance imposed on the spacecraft 1 becomes significant.

Therefore, with regard to attitude control against such reaction, the conventional control system amounts to an increase in cost and complication of the system and accurate control becomes difficult.

Otherwise, for example, according to Japanese Unexamined Patent Publication No. JP-A-62-125998, there is described an attitude control method of a spacecraft in which a feedback signal storing unit is installed in a conventional closed loop control, a change in a feedback signal is stored to the storing unit and error compensation command is determined such that attitude error is reduced based on the data and according to Japanese Unexamined Patent Publication No. JP-A-8-282598, there is disclosed a technology in an attitude control device in an artificial satellite for installing torque compensating means for generating torque necessary for canceling angular momentum from an actuator and drive controlling means which is constituted such that drive of a movable unit is retarded more than generation of the torque, however, any of them are insufficient for resolving the above-described problem.

SUMMARY OF THE INVENTION

Accordingly, it is an object of the present invention to provide an inexpensive attitude control device and attitude control method improving the above-described drawback of the conventional technology and easily and accurately compensating for disturbance with a simple constitution and without severely compensating for a drive disturbance source.

The present invention adopts a technical constitution described below to achieve the above-described object.

According to a first aspect of the present invention, there is provided a state control device of a moving body comprising a navigation dynamics inherent to the moving body in consideration of outside noise such as disturbance torque, an actuator for driving the navigation dynamics, first controlling means for outputting a control signal for driving the actuator in response to a predetermined first output signal outputted from the navigation dynamics, and adding means for outputting a control signal for controlling the actuator in a feedforward control in response to the outside noise by adding an estimated value of the outside noise to the control signal outputted from the first controlling means, further comprising second controlling means for outputting an error amount of the estimated value of the outside noise based on a predetermined second signal outputted from the navigation dynamics, wherein an error amount value of the estimated value of the outside noise outputted from the second controlling means is inputted to the adding means.

According to a second aspect of the present invention, there is provided a state control method of a moving body which comprises a navigation dynamics inherent to the moving body in consideration of outside noise, an actuator for driving the navigation dynamics, first controlling means for outputting a control signal for driving the actuator in response to a predetermined first output signal outputted from the navigation dynamics and adding means for outputting a control signal for controlling the actuator in a feedforward control in response to the outside noise by adding an estimated value of the outside noise to the control signal outputted from the first controlling means, further comprising second controlling means, comprising the steps of outputting an error amount of the estimated value of the outside noise based on a predetermined second signal outputted from the navigation dynamics in the second controlling means, inputting an error amount value of the estimated value of the outside noise to the adding means, and outputting an actuator control signal compensating for the error amount of the estimated value of the outside noise from the adding means.

The state control device of a moving body and the state control method of a moving body according to the present invention adopts technical constitution mentioned above and therefore, disturbance applied on the spacecraft 1 is predicted and necessary disturbance compensating data is applied to the actuator in real time therewith by which the state control device of a moving body capable of achieving shortening of a time period of design and development with high accuracy and at a low cost is realized.

DETAILED DESCRIPTION OF PREFERRED EMBODIMENTS

A detailed explanation will be given of the constitution of a specific example of a state control device of a moving body and a state control method of a moving body according to the present invention in reference to the drawings as follows.

Further, although an explanation will be given of a state control device 20 of a moving body according to the present invention as follows mainly with respect to a spacecraft as an example, the moving body according to the present invention is not limited to the spacecraft but the present invention naturally can be used in state control of every moving body.

Figure 1:
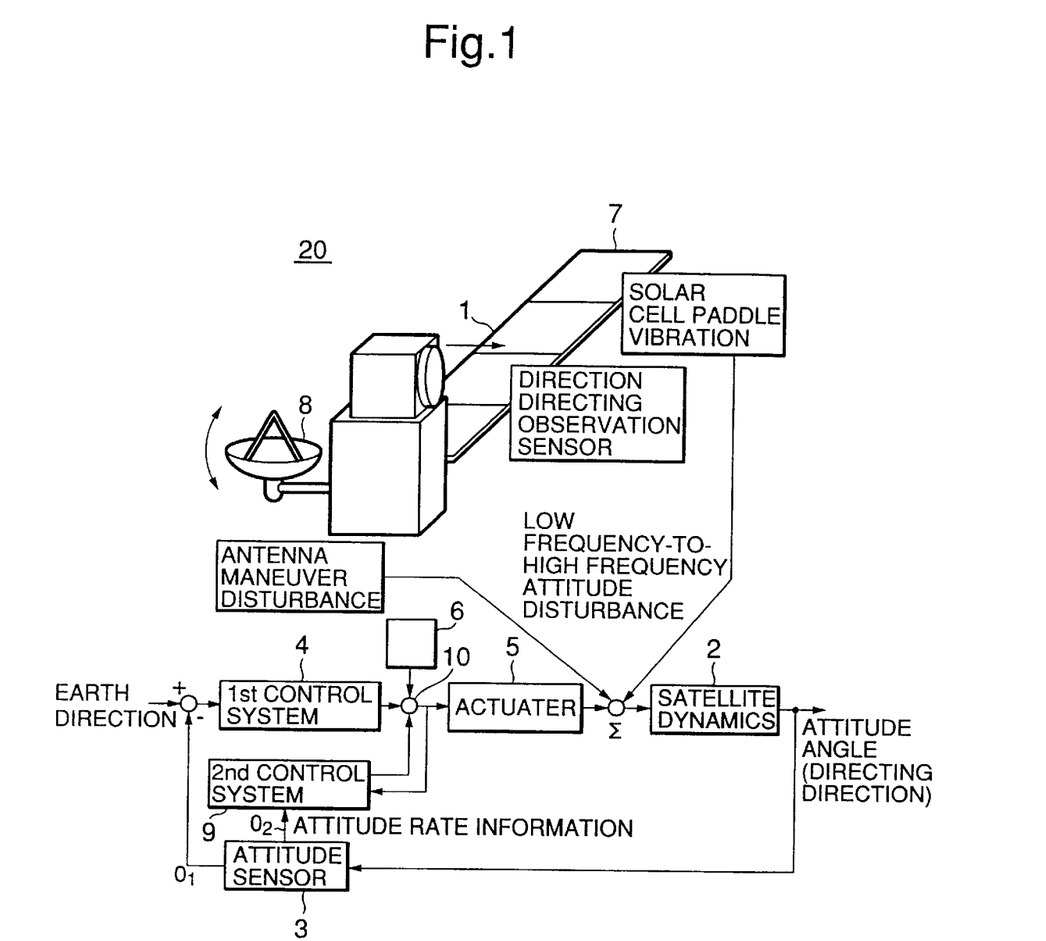
FIG. 1 is a block diagram showing the constitution of a specific example of a state control device for a moving body according to the present invention.

FIG. 1 is a block diagram for explaining a specific example of the constitution of the state control device 20 of a moving body according to the present invention. In the drawing, the state control device 20 of a moving body is constituted by the navigation dynamics 2 inherent to the moving body in consideration of outside noise, the actuator 5 for driving the navigation dynamics 2, first controlling means 4 for outputting a control signal for driving the actuator 5 in response to a predetermined first output signal O1 outputted through a attitude sennsor 3 from the navigation dynamics 2 and adding means 10 for adding an estimated value q of the outside noise and the control signal outputted from the first controlling means 4 to output a control signal u, thereby controlling the actuator 5 in a feedforward control in response to the outside noise. According to the present invention, the sate control device 20 further comprises second controlling means 9 for outputting an error amount of the estimated value of the outside noise based on a predetermined second signal O2 outputted through the attitude sennsor 3 from the navigation dynamics wherein the error amount of the estimated value of the outside noise outputted from the second controlling means 9 is further inputted to the adding means 10.

That is, different from the conventional technical thought achieving attitude accuracy by being dependent on the above-described conventional feedforward system, for example, a method in which angular momentum or torque for compensating for a drive side output data (angle or angular velocity data or the like) constituting disturbance while establishing communication synchronism or successively receiving it by interruption processing, is successively calculated and is outputted to reaction wheels which are actuators, the present invention is a system in which the feedforward control makes interface with the drive side with a target of about 90% of the disturbance torque to be compensated, i.e., an error amount in correspondence with error which cannot be removed by a disturbance torque compensator and remaining disturbance which cannot be compensated is compensated by a control loop for an attitude system.

As described above, according to the present invention, there is established a system in which a minor feedback loop for considerably alleviating a condition of the estimated error in comparison with the conventional system and converging a variation in the attitude caused by a remaining portion of the estimated error to the target attitude (=0), that is, the second controlling means 9 is installed in parallel with a general major feedback loop, that is, the first controlling means 4 and outputs from the first and the second controlling means 4 and 9 are outputted to the reaction wheel 5 constituting the actuator of the spacecraft 1.

In this case, the feedforward signal may further be added to the first controlling means 4 and the second controlling means 9 or may not be added thereto depending on cases.

When the feedforward signal is added to the above-described controlling means, the minor feedback loop compensates for the remaining portion of the feedforward signal and when it is not added, it compensates for the remaining portion of the major feedback loop.

That is, according to the present invention, by adding the minor feedback loop, that is, the second controlling means 9, a compensation torque for making a difference between the target attitude (=0) and observed attitude to 0 can be added and the attitude variation caused by an error in feedforward control or an induced vibration amplitude of a flexible attachment which has been conventionally problematic can be restrained low in comparison with that of the conventional attitude control system with only feedforward control and can be converged far swiftly.

That is, the present invention is featured in that in order to improve the situation, the accuracy of the feedforward control is not emphasized but the principal object of the present invention resides in positively removing disturbance which cannot be removed by feedforward control by a minor loop control system which is the second controlling means 9 and accordingly, thereby, conversely, a request for tolerance on the side of the drive system and a request for synchronism with communication timing can significantly be alleviated.

Figure 2:
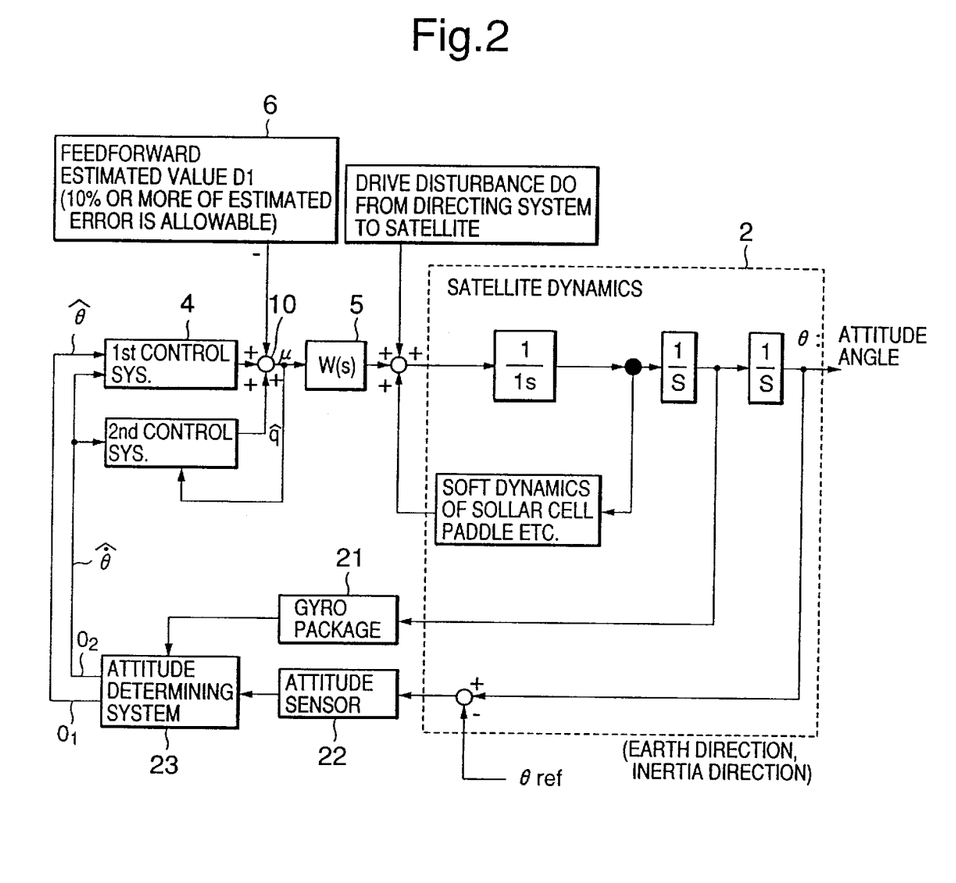
FIG. 2 is a block diagram showing in further details the constitution of the specific example of the state control device for a moving body according to the present invention.

FIG. 2 is a block diagram explaining in further details the constitution of the state control device 20 of a moving body according to the present invention shown by FIG. 1 and the navigation dynamics 2 used in the present invention is provided with a constitution indicated, for example, in broken lines of FIG. 2.

Such a constitution is quite general.

Further, it is preferable in the present invention that the second controlling means 9 uses an output value from the adding means 10 as a feedback value in calculating the error amount value of the estimated value of the outside noise.

Further, it is preferable in the present invention that the predetermined first output signal O1 outputted from the navigation dynamics 2 and inputted to the first controlling means 4, is an estimated value $\hat{\theta}$ ($\theta$ hat) of the rotational angle information of the moving body 1 and the predetermined second output signal O2 outputted from the navigation dynamics 2 and inputted to the second controlling means 9 is an estimated value (hat of differential value of $\hat{\theta}$, ($\dot{\theta}$ hat)) of the angular acceleration information of the moving body 1.

Further, according to the present invention, the moving body 1 represents all the moving bodies including a spacecraft.

Further, as mentioned above, although all kinds of noises are present as disturbance applied on the moving body 1, particularly when the moving body 1 is a satellite, the present invention is suitable for dealing with disturbance which is caused owing to reaction torque on the satellite caused by a subsystem which is mounted on the satellite and is driven independently from the satellite, or a flexible structure, for example, an antenna, a solar cell panel or the like.

Further, the principal portion of the state control of the moving body 1 according to the present invention is attitude control of the moving body 1.

A further detailed explanation will be given of the constitution and the operation of the state control device 20 of a moving body according to the present invention in reference to FIG. 2.

That is, in FIG. 2, drive disturbance d0 applied from a direction system, that is, an antenna, a camera or the like and flexible dynamics are applied between the actuator 5 and the navigation dynamics 2.

Such a disturbance d0 is shown as disturbance which is significant and representative among disturbance applied on the satellite and inner disturbance, however, a specific value thereof cannot be measured.

Meanwhile, the state control device 20 of a moving body according to the present invention is provided with an attitude determining system 23 constituted by two of an attitude sensor 22 for detecting an attitude angle of the satellite 1 and a gyro package (inertia reference device) 21 for detecting an attitude rate (angular velocity).

Further, according to the present invention, the attitude determining system is not necessarily a system needing the two but in the present invention, the attitude rate may be measured by any method.

According to the present invention, what are specifically outputted from the attitude determining system 23 are the first output signal O1 and the second output signal O2 which are inputted to the first controlling means 4, the first output signal O1 is the estimated value $\hat{\theta}$ ($\theta$ hat) of the rotational angle information of the moving body 1 which is determined based on the angle information outputted from the navigation dynamics 2 and the second output signal O2 is the estimated value (hat of differential value of $\hat{\theta}$, ($\dot{\theta}$ hat)) of the angular acceleration information of the moving body 1 which is determined based on the angular acceleration information outputted from the navigation dynamics 2.

The attitude angle information and the attitude rate (angular velocity) of the satellite 1 mentioned above are outputted from the navigation dynamics 2 by a publicly-known method. Further, the state control device 20 of a moving body according to the present invention is provided with a major loop control system, that is, the first controlling means 4 for calculating a control output from the first output signal O1 which is the attitude angle information and a minor loop control system, that is, the second controlling means 9 for reinforcing the major loop control system by the second output signal O2 which is the attitude rate information and further provided with the reaction wheel which is the actuator 5 for actually generating control torque.

That is, in the state control device 20 of a moving body according to the present invention, in the first controlling means 4 for executing the normal PID compensation control and the separately-installed second controlling means in which an estimated value of disturbance is not regarded as a completely accurate value, an estimated value in correspondence with an error amount of the estimated value of disturbance is calculated by using a predetermined function and the value is used as data for compensating for the error amount of the estimated value of the disturbance.

Conventionally, as mentioned above, generally, the "open loop feedforward compensation" is carried out as compensation for the drive disturbance.

According to such a system, the attitude control device receives by communication a detected signal of the drive system, for example, a detected value of angle by an encoder or a resolver, calculates angular momentum or torque caused by the drive system from moment of inertia, mass and position of gravitational center of the drive system which is previously interfaced and adds angular momentum or torque having a sign reverse thereto to an output from the control device or a driver of the reaction wheel. Such a conventional system is not preferable since the above-described problem remains.

The following shows a procedure and its algorism of a control method used in the state control device of a moving body according to the present invention.

An output instruction value (wheel torque command) of the attitude control device according to the present invention is designated by notation u.

Further, when an output signal outputted from the first controlling means 4 is designated by notation G1 (s), the output signal G1 (s) is shown by Equation (1) as follows.

[Equation 1] (1)

$$G1(s) = \left[K_p + \frac{K_i}{s} K_d\right] \begin{bmatrix} \theta \\ \hat{\theta} \end{bmatrix}$$

Further, Equation (1) is a function which is already publicly-known, notation K designates a pertinent coefficient and notation s designates Laplace transformation operator.

Further, when an output signal outputted from the second controlling means 9 according to the present invention is designated by notation G2 (s), the output signal G2 (s) is shown by Equation (2) as follows.

[Equation 2] (2)

$$G2(s) = \frac{\alpha \beta \gamma}{(s-\alpha)(s-\beta)(s-\gamma)} \left[-\left(\frac{1}{W(s)}\right) I_s S1\right] \begin{bmatrix} \hat{\theta} \\ u \end{bmatrix}$$

Further, the left end term in Equation (2) shows a function of a low pass filter and notations α, β and γ designate pertinent constants.

Therefore, the form of the equation only represents a general third degree low pass filter for convenience and any form of a low pass filter can be used.

Further, notation W (s) in Equation (2) designates a transfer function as shown by Equation (3) shown below indicating that an output Tw of the wheel is delayed by a time constant of the wheel in respect of the output command u of the control device.

Further, notation Is in Equation (2) shown above designates moment of inertia of the moving body 1 including the spacecraft.

Further, as mentioned above, Equation (2) is a control function which is particularly set in the present invention.

[Equation 3] (3)

$$W(s) = \frac{T_w}{u} = \frac{1}{t_w s + 1}$$

As is apparent from Equation (2), according to the present invention, in the minor loop feedback system, that is, the second controlling means 9, an output of its own is used, by using such control data, as shown by Equation (4), an error value (q hat) of the estimated value of disturbance (another drive system disturbance+paddle oscillation disturbance or the like) applied in the rear of the wheel (front of attitude system dynamics), that is, a compensation torque with regard to the disturbance q is estimated by the control output u, the moment of inertia (Is) of the satellite and the estimated value (θ dot hat) of the detected rate.

[Equation 4] (4)

$$\hat{q} = u - (t_w s + 1) I_s s \hat{\theta}$$

That is, it is the feature of the present invention that the error amount value of the estimated value of disturbance used in the second controlling means is calculated by using information all of which has already been known. In other words, an additional sensor is not necessary. Further, the second term of Equation (4) is substantially equal to the estimated value of disturbance.

According to the present invention, Equation (4) described above is multiplied by the low pass filter (coefficient represented by the first term on the right hand side of Equation (2)) for making Equation (4) proper, a product of a minus sign thereof is multiplied by a wheel reverse model and a product thereof is added to the major loop feedback system, that is, the first controlling means 4 as torque for canceling disturbance.

The low pass filter does not effect influence of retarding the response of the system and signifies that a frequency range effecting on the minor feedback loop which is the second controlling means 9 is prescribed.

Thereby, the minor feedback group of the present invention can restrain summerizingly disturbance having a large absolute value and a low frequency, which harmfully influences accuracy of satellite motion conventionally, and large soft vibration of the paddle or the like.

Figure 3:
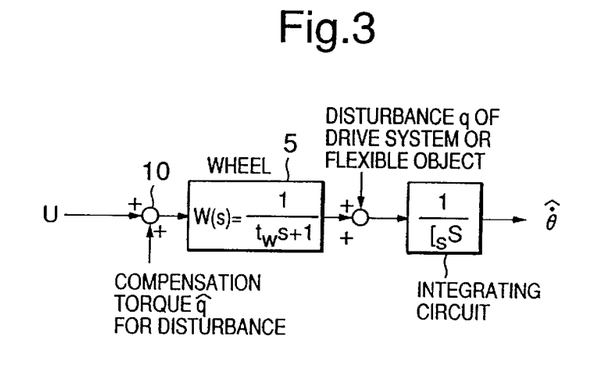
FIG. 3 is a diagram showing the principle of a control method according to the present invention.

The principle of the state control method of a moving body according to the present invention mentioned above is summarized as shown by FIG. 3.

Further, FIGS. 4(A), 4(B), 4(C), 4(D) and 4(E) show a procedure in which the error amount of the estimated value of disturbance is efficiently and accurately removed when the state control method of a moving body according to the present invention is used.

Figure 4A:
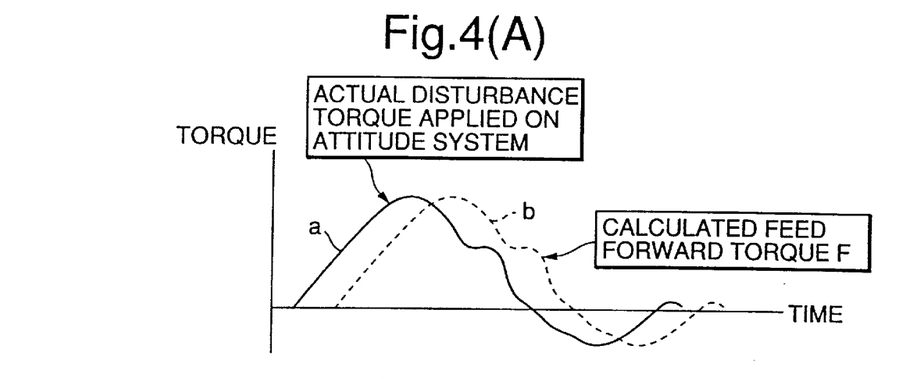
FIGS. 4(A), 4(B), 4(C), 4(D) and 4(E) are graphs showing an effect of a state control method of a moving body according to the present invention.

That is, graph a in FIG. 4(A) indicates a change in actual disturbance toque q applied on the attitude system of the moving body 1 and graph b indicates calculated feedforward torque F (estimated disturbance torque) which is estimated in the conventional feedforward estimating circuit 6.

Figure 4B:
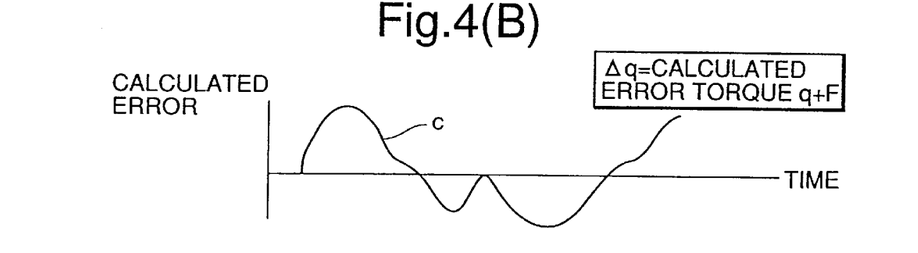

Graph c of FIG. 4(B) shows an error Δq produced by subtracting disturbance F which is estimated by the conventional feedforward calculation from the actual disturbance q which is applied on the moving body 1 (ΔQ=q−F).

Figure 4C:
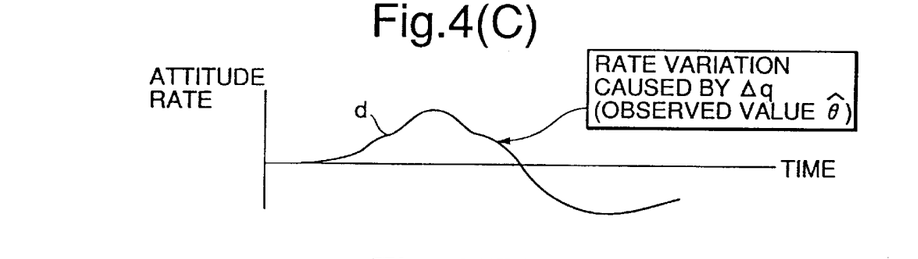

Further, FIG. 4(C) is a graph indicating angular velocity (θ dot hat) caused by the error Δq, that is, the rate variation, showing that the remaining portion deteriorates the accuracy of the system.

Figure 4D:
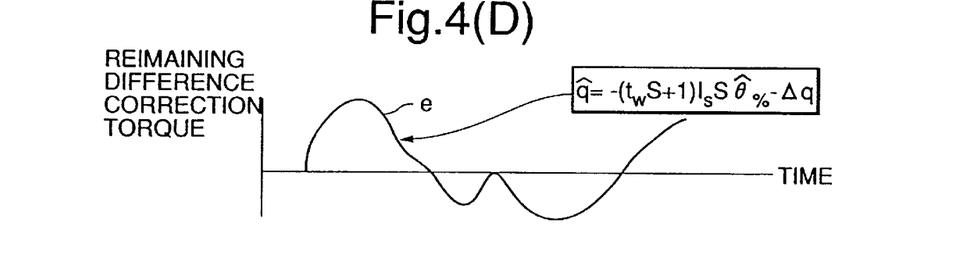

Further, FIG. 4(D) is a graph indicating the remaining difference correction torque (q hat) in correspondence with the error of the estimated value of disturbance which is calculated by using Equation (4) according to the present invention.

When graph e of FIG. 4(D) is compared with graph c of FIG. 4(B), it is known that the both are considerably coincident in accuracy.

Figure 4E:
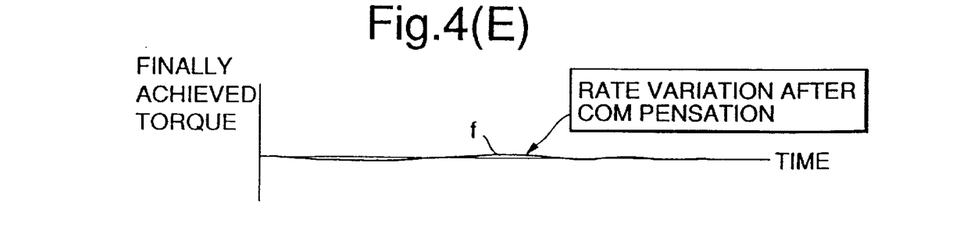

Further, FIG. 4(E) shows a graph indicating a change in the attitude rate produced by a result of performing control operation by using the state control device 20 of a moving body according to the present invention shown by FIG. 2 by using graph e of FIG. 4(D), that is, as a result of processing by using compensation data in correspondence with the error amount of the estimated value of disturbance.

As is apparent from FIG. 4(E), by using the state control method of a moving body according to the present invention, the attitude of the moving body 1 can extremely accurately be controlled against disturbance.

The state control device 20 of a moving body and the state control method of a moving body according to the present invention adopts the technical constitution mentioned above and accordingly, by adding the compensation toque which is equivalent and opposite to disturbance q caused by the drive system or the flexible structure to thereby add the compensation torque (q hat) shown by Equation (4) to the actuator in real time, the compensation without time delay in contrast to that in the case of simple feedforward processing by which the control accuracy and the attitude stability can considerably be promoted.

Further, according to the present invention, minute grasp of parameters of the drive system which is the premise of promoting the accuracy and interface such as communication synchronization or the like are dispensed with.

Further, the effect of the state control device 20 of a moving body according to the present invention is easy to understand when it is represented by error characteristic from disturbance in the closed loop to the attitude error.

Figure 5:
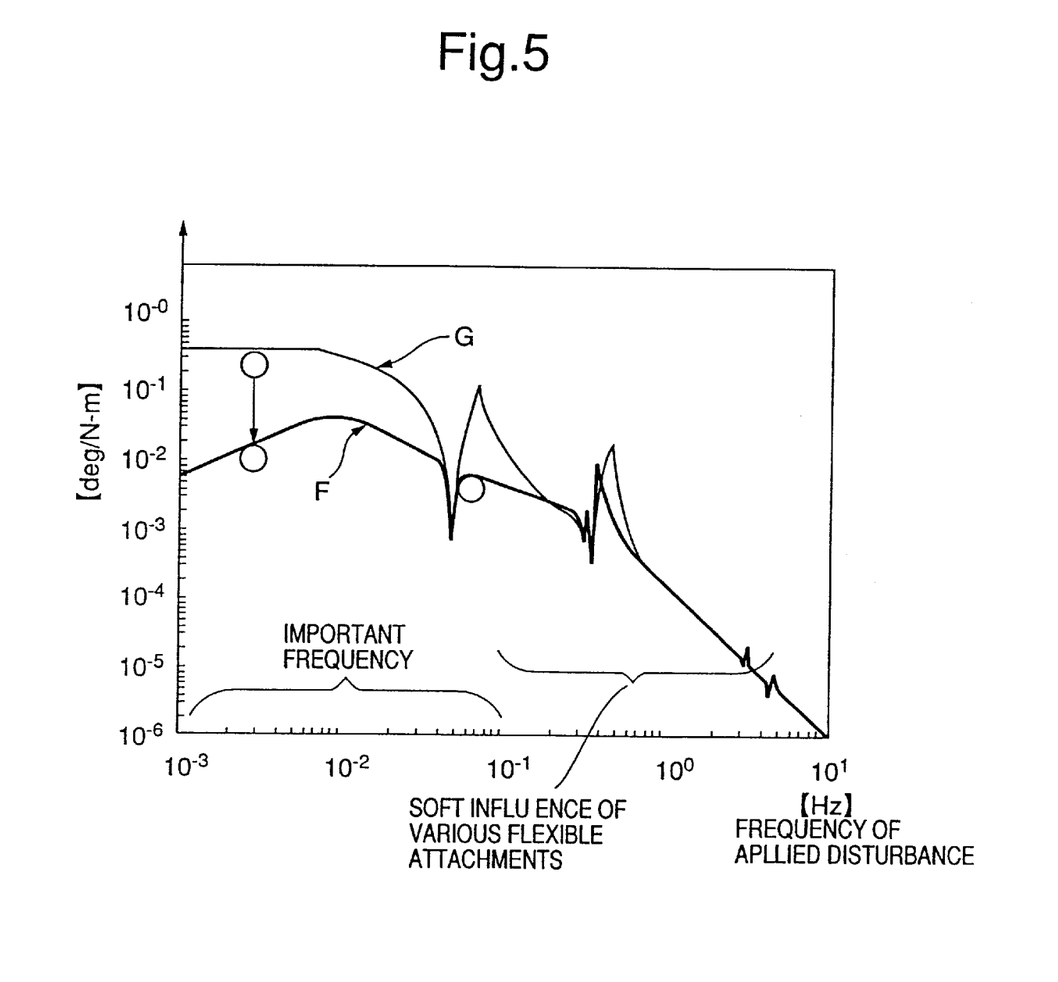
FIG. 5 is a graph showing a comparison between the state control method of a moving body according to the present invention and a conventional example.

FIG. 5 compares the actual state of the state control of a moving body using the state control device of a moving body according to the present invention with the conventional method. In the drawing, graph F is a graph showing an effect of restraining disturbance according to the present invention and graph G is a graph showing an effect of restraining disturbance of the attitude error in the case in which the conventional state control device of a moving body is used and in the case in which PID control and feedforward control are used (compensation accuracy ; 90%).

Further, what are used as inputs are only the detected value of the attitude rate and the output from the control system before one sampling operation which do not constitute calculation load of a computer.

Further, the ordinate of FIG. 5 indicates an attitude error angle in correspondence with magnitude of distance and the abscissa indicates the frequency of disturbance applied on the moving body.

That is, as is apparent from FIG. 5, according to the present invention, compared with the conventional example, in respect of the same amount of disturbance, with regard to frequencies of 0.001 through 0.1 Hz which are most important for the attitude accuracy, the accuracy can be reduced by $\frac{1}{10}$ through $\frac{1}{100}$ of that in the conventional example.

Further, in respect of disturbance with regard to a flexible structure of a paddle or the like at low frequencies, it is known that control effect more excellent than that in the conventional method is achieved in a range of 0.1 through 1 Hz.

That is, it is apparent that by the device of the present invention, error characteristic at a low region which is equal to or lower than the attitude system control band is significantly promoted and peaks of a flexible paddle mode at higher frequencies are canceled. Thereby, even when the drive system is operated, the attitude variation caused by the remaining difference portion of feedforward control is minimized and the robust performance with regard to a change in the natural frequency of a flexible structure such as a paddle or the like is also realized simultaneously.

Figure 6A:
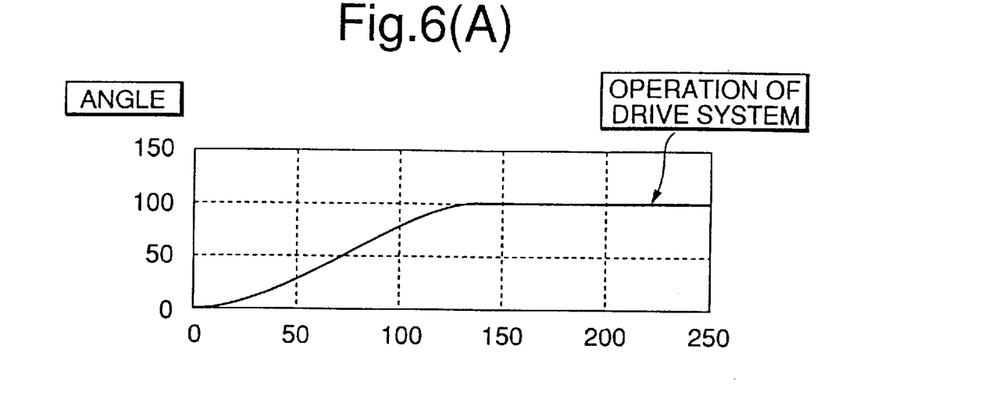
FIGS. 6(A), 6(B) and 6(C) are graphs showing an effect of the state control method of a moving body according to the present invention.
Figure 6B:
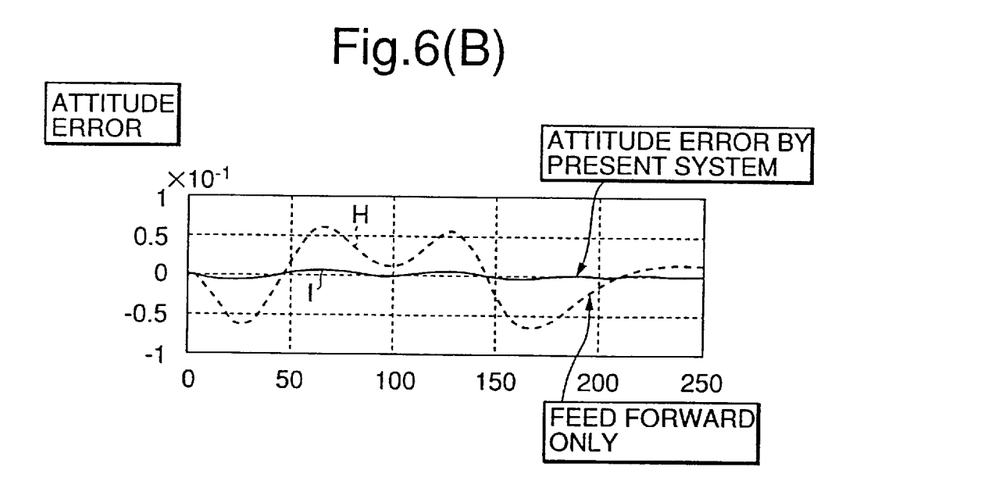
Figure 6C:
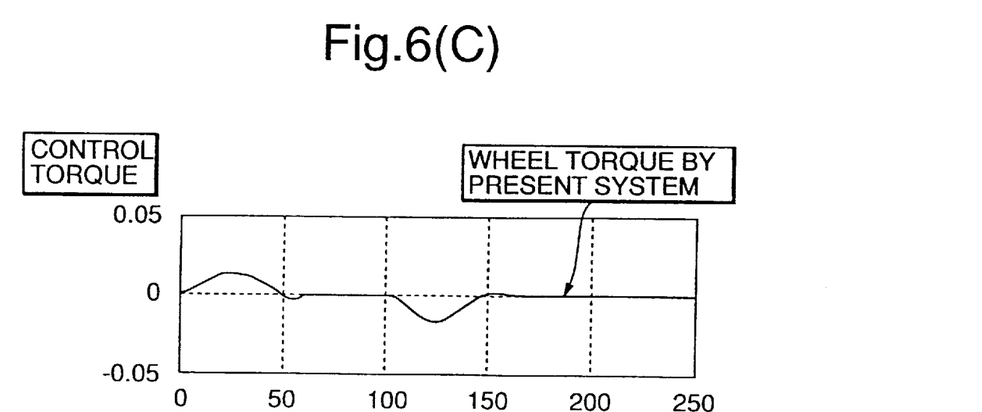

FIGS. 6(A), 6(B) and 6(C) show a result of analyzing promotion of control accuracy and promotion of attitude stability.

That is, FIG. 6(A) shows an example of an operation angle applied on the drive system of the moving body 1 and FIG. 6(B) shows an attitude control error signal (angle) caused in the state control system of a moving body when a drive control signal of FIG. 6(A) is applied on the moving body 1. Graph H is a graph indicating an attitude error provided by the conventional control method in which only the feedforward processing is used and graph H is a graph indicating an attitude error provided by the state control system of the moving body according to the present invention.

As is apparent from the graphs, according to the state control system of the moving body of the present invention, the attitude error signal is clearly reduced compared with that in the conventional case. As a result, as shown by FIG. 6(C), the wheel torque command applied on the actuator is constituted such that clearly, immediately before driving the moving body 1, torque in a direction reverse to the rotational direction of the moving body is applied and is constituted such that immediately before stopping rotation of the moving body 1, torque in a direction opposed thereto is applied.

That is, steep movement is not particularly required for the actuator and an actuator (wheel in this case) equivalent to a conventional one is sufficient.

Therefore, the attitude control of the moving body including disturbance can accurately be carried out according to the present invention.

What is claimed is:

1. A state control device of a moving body comprising:
   a navigation dynamics inherent to the moving body in consideration of outside noise;
   an actuator for driving the navigation dynamics;
   first controlling means for outputting a control signal for driving the actuator in response to a predetermined first output signal outputted from the navigation dynamics; and
   adding means for outputting a control signal for controlling the actuator in a feedforward control in response to the outside noise by adding an estimated value of the outside noise to the control signal outputted from the first controlling means, further comprising:

second controlling means for outputting an error amount of the estimated value of the outside noise based on a predetermined second signal outputted from the navigation dynamics in the second controlling means;

wherein an error amount value of the estimated value of the outside noise outputted from the second controlling means is inputted to the adding means.

2. The state control device of a moving body according to claim 1, wherein the second control means uses an output value from the adding means as a feedback value in calculating the error amount value of the estimated value of the outside noise.

3. The state control device of a moving body according to claim 1, wherein the predetermined first output signal outputted from the navigation dynamics and inputted to the first controlling means is an estimated value of angle information of the moving body and the predetermined second output signal outputted from the navigation dynamics and inputted to the second controlling means is an estimated value of angular acceleration information of the moving body.

4. The state control device of a moving body according to claim 1, wherein the moving body is a spacecraft.

5. The state control device of a moving body according to claim 1, wherein the outside noise is caused mainly owing to a flexible structure.

6. The state control device of a moving body according to claim 5, wherein the flexible structure is an antenna or a solar cell paddle.

7. The state control device of a moving body according to claim 1, wherein the state control of the moving body is attitude control of the moving body.

8. A state control method of a moving body which comprises a navigation dynamics inherent to the moving body in consideration of outside noise, an actuator for driving the navigation dynamics, first controlling means for outputting a control signal for driving the actuator in response to a predetermined first output signal outputted from the navigation dynamics and adding means for outputting a control signal for controlling the actuator in a feedforward control in response to the outside noise by adding an estimated value of the outside noise to the control signal outputted from the first controlling means, further comprising second controlling means, comprising the steps of:

outputting an error amount of the estimated value of the outside noise based on a predetermined second signal outputted from the navigation dynamics in the second controlling means;

inputting an error amount value of the estimated value of the outside noise to the adding means; and outputting an actuator control signal compensating for the error amount of the estimated value of the outside noise from the adding means.

9. The state control method of a moving body according to claim 8, wherein the second controlling means calculates the error amount value of the estimated value of the outside noise with the predetermined second signal outputted from the navigation dynamics and an output value of the adding means as an input.

10. A state control method of a moving body which comprises a navigation dynamics inherent to the moving body in consideration of outside noise, an actuator for driving the navigation dynamics, first controlling means for outputting a control signal for driving the actuator in response to a predetermined first output signal outputted from the navigation dynamics and adding means for outputting a control signal for controlling the actuator in a feedforward control in response to the outside noise by adding an estimated value of the outside noise to the control signal outputted from the first controlling means, further comprising second controlling means, comprising:

a first step of inputting a predetermined second signal outputted from the navigation dynamics in the second controlling means;

a second step of inputting an output value from the adding means;

a third step of calculating an error amount value of the estimated value of the outside noise by using a predetermined function; and a fourth step of applying the calculated error amount value of the estimated value of the outside noise to the adding means.

11. The state control method of a moving body according to claim 8, wherein the predetermined first output signal outputted from the navigation dynamics and inputted to the first controlling means is an estimated value of angle information of the moving body and the predetermined second output signal outputted from the navigation dynamics and inputted to the second controlling means is an estimated value of angular acceleration information of the moving body.

12. The state control method of a moving body according to claim 8, wherein the moving body is a spacecraft.

* * * * *